United States Patent [19]
Falk et al.

[11] Patent Number: 5,516,169
[45] Date of Patent: May 14, 1996

[54] BUMPER ATTACHMENT MEANS FOR AN AMUSEMENT RIDE VEHICLE

[76] Inventors: Alton B. Falk, 13240 McCaleb Rd., Monmouth, Oreg. 97361; Michael L. Sweringen, 128 Phoenix Ave. SE., Salem, Oreg. 97306

[21] Appl. No.: 391,126

[22] Filed: Feb. 21, 1995

[51] Int. Cl.⁶ .................................................. B60R 19/22
[52] U.S. Cl. ........................................... 293/127; 293/107
[58] Field of Search .................................. 293/102, 107, 293/120, 117, 127

[56] References Cited

U.S. PATENT DOCUMENTS

| | | | |
|---|---|---|---|
| 4,324,301 | 4/1982 | Eyerly | 180/2 |
| 4,838,592 | 6/1989 | Sobodos et al. | 293/102 X |

Primary Examiner—Joseph D. Pape
Attorney, Agent, or Firm—James D. Givnan, Jr.

[57] ABSTRACT

An inflatable bumper is disposed about a circular outer wall of a vehicle with a cover urging the bumper into wall engagement. The cover has sleeve portions through which extend cables for drawing the cover snug urging the bumper into wall engagement. Upper and lower ring members on the wall position the bumper and cover and serve to support clamp assemblies for locking the cables in a tensioned condition. A tensioning device includes provision for reception of a wrench for winding of a cable end segment to tension same prior to clamping.

8 Claims, 1 Drawing Sheet

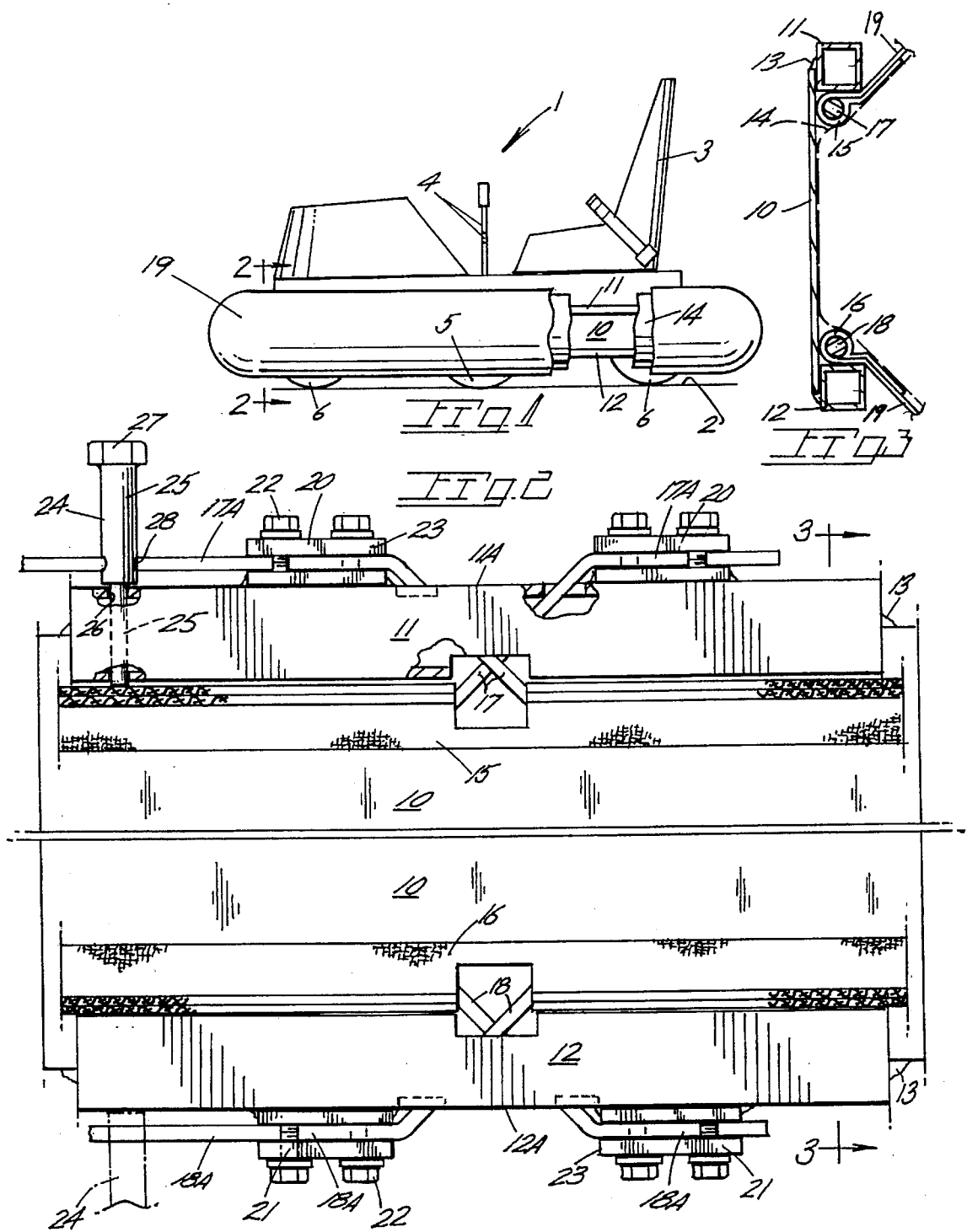

5,516,169

BUMPER ATTACHMENT MEANS FOR AN AMUSEMENT RIDE VEHICLE

BACKGROUND OF THE INVENTION

The present invention pertains generally to vehicles used in an amusement ride known in the trade as "bumper cars". Such cars are typically occupied by a single operator and include a peripheral, highly flexible bumper to prevent severe impact with a similar vehicle of the amusement ride.

Bumper cars, typically include a prime mover and transmission system mounted on a chasis having an outer perimetical wall which carries the circular bumper. Contact of a bumper car against a barrier or like vehicle is mitigated by collapsing of the bumper, usually including an inflated tube. Such general structure has been in use for some time with one such embodiment of a bumper car being shown in U.S. Pat. No. 4,324,301.

In the above noted patent a large inflated inner tube extends about the circular outer wall of the car and is held in place on the wall by a pliable fabric cover secured by draw cords which pass through openings in the car wall and then are fitted with clamps to prevent cord retraction through the openings. Such a system complicates the repair of the fabric cover or the inflated tube in that cover removal is time consuming as the car must be elevated to permit access to the cord securing arrangement.

SUMMARY OF THE PRESENT INVENTION

The present invention is embodied within means for securing a circular bumper to a vehicle such as a bumper car of an amusement ride.

Vehicles for use in certain amusement rides are termed bumper cars and typically include a chassis with an outer circular wall to which is affixed an inflated component to protect the vehicle and its occupant from sudden loads when the car encounters a barrier or another car of the amusement ride. At certain times it is necessary to replace or repair the inflatable member confined in place within a pliable cover. To facilitate, at least partial removal of the cover from the vehicle, provision is made for securing cover attaching cords externally to the outer wall structure to obviate access to the underside of the car. A cord tensioner permits the pliable cover to be drawn into snug engagement about the vehicle. Accordingly the cover may be partially removed, the repair made, and the cover reinstalled all without special tools or the removal of the vehicle to a repair location.

Important objectives of the present invention include the provision of means enabling the securement of a resilient bumper and a pliable retainer cover therefor mounted on the outer surface of a vehicle wall to permit ready access to the cover and bumper when necessary; the provision of attachment means which includes the provision of a tensioning device for tensioning a draw cord passing through a sleeve portion of a pliable cover with means provided for securing the tensioned cord; the provision of attachment means carried by the chassis outer wall of a bumper car with the provision of means for tensioning and securing a cover draw cord; the provision of bumper attachment means for an inflatable bumper and its cover with both installation, tensioning and removal all being accomplished without access being necessary to the underside of the vehicle chassis.

BRIEF DESCRIPTION OF THE DRAWINGS

In the accompanying drawings:

FIG. 1 is a side elevational view of a bumper car with fragments of a bumper cover and bumper member broken away;

FIG. 2 is an elevational view taken along line 2—2 of FIG. 1 and showing bumper attachment details.

FIG. 3 is a cross sectional view taken along line 3—3 of FIG. 2 and showing further bumper attachment details.

DETAILED DESCRIPTION OF THE PREFERRED EMBODIMENTS

With continuing attention to the drawings, wherein applied reference numerals indicate parts similarly hereinafter identified, the reference numeral 1 indicates generally an amusement ride vehicle termed in the trade, a bumper car. Such cars may be electrically powered and utilize a set of electrical contacts for sliding engagement with conductor plates embedded in a floor surface 2.

With attention again to vehicle 1, the same includes a seat 3 and operator controls 4 for regulating the driving of wheels 5 to control the vehicle. Caster wheels are at 6. The foregoing is intended to be a general description of a bumper car on which the present invention may be practiced. Such vehicles are of circular configuration in plan view with an annular bumper to cushion the impact of the vehicle against obstructions such as other like vehicles of the amusement ride. A large diameter inner tube may be used as such a bumper.

An outer annular wall 10 of the vehicle is part of the vehicle chassis which serves to house various power transmission components and controls for selective application of power to wheels 5.

In place on annular wall 10 are upper and lower rings 11 and 12 retained in place by welds as at 13. A pliable cover 19 substantially encloses an inflatable tube 14, the latter may be embodied in a large diameter inner tube as noted above. Extending along lengthwise margins of cover 19 are upper and lower sleeves 15 and 16 formed by lengthwise stitching. Passing through each sleeve 15 and 16 is a cord at 17 and 18 which urge the sleeves into biased engagement with vehicle outer wall 10 and, at least partially against rings 11 and 12. In one embodiment of the invention cords 17 and 18 are cables.

Cords 17 and 18 terminate in end segments 17A and 18A in clamped securement by means of pairs of clamp assemblies 20 and 21 on rings 11 and 12. Clamp assemblies 20 and 21 are in place on oppositely facing ring surfaces 11A and 12A. Each clamp assembly includes threaded fasteners 22 which when tightened urge a clamp plate 23 into engagement with tensioned cord segment. Accordingly the cords 17 and 18, when clamped in place by their respective clamp assemblies, serve to retain the fabric sleeves and cover 19 in place in a snugged manner, as later explained, on outer wall 10 of the vehicle.

A cord tensioner at 24 includes a spindle 25 for insertion into aligned opening 26 in rings 11 and 12 to permit the tensioner to be rotated about its vertical axis upon application of the wrench to a head 27 of the tensioner. An aperture at 28 in the tensioner receives an end segment 17A–18A of the cord being tensioned, whereupon rotation of the tensioner will wind the cord on the spindle to draw the cord taught, whereupon the clamp assembly 20–21 adjacent the tensioner, may be tightened to retain the cord in a tensioned condition. Subsequent to the tensioning operation, cord tensioner 24 may be removed from ring 11 or 12.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

We claim:

1. Means for securing a bumper to the peripheral wall of a vehicle including, a pliable cover for said bumper, elongate tensional means for urging said cover into engagement with the peripheral wall of the vehicle, cover positioning means in place about said peripheral wall and including a clamp, and a spindle on which said tensional means may be wound prior to securement in a tensioned state with said clamp.

2. The invention claimed in claim 1 wherein said cover positioning means includes upper and lower rings in place about said peripheral wall and against which the cover may be snugged.

3. The invention claimed in claim 2 wherein said spindle is removably journaled in one of said rings and which includes a head for reception of a wrenching tool.

4. The invention claimed in claim 2 wherein said clamp is carried by one of said rings.

5. In a vehicle having an outer peripheral wall, the improvement comprising, a bumper in place about said wall, a pliable cover disposed about said bumper and having sleeves formed therein, elongate tensional means extending through said sleeves for urging said cover into snug engagement with said wall, cover positioning members on said wall, a clamp assembly, and a tensioning device for receiving said tensional means prior to engagement of the clamp assembly with the tensional means.

6. The improvement claimed in claim 5 wherein said cover positioning members are of annular configuration, said clamp assembly in place on each of said members.

7. The improvement claimed in claim 6 wherein said tensioning device includes a spindle journalled on said cover positioning members.

8. The improvement claimed in claim 7 wherein said spindle includes surfaces for reception of a wrenching tool.

* * * * *